US009771812B2

(12) United States Patent
Wilke

(10) Patent No.: US 9,771,812 B2
(45) Date of Patent: Sep. 26, 2017

(54) GAS TURBINE

(71) Applicant: Siemens Aktiengesellschaft, Munich (DE)

(72) Inventor: Martin Wilke, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/127,491

(22) PCT Filed: Mar. 19, 2015

(86) PCT No.: PCT/EP2015/055790
§ 371 (c)(1),
(2) Date: Sep. 20, 2016

(87) PCT Pub. No.: WO2015/150093
PCT Pub. Date: Oct. 8, 2015

(65) Prior Publication Data
US 2017/0130594 A1 May 11, 2017

(30) Foreign Application Priority Data

Mar. 31, 2014 (EP) ..................................... 14162725

(51) Int. Cl.
*F01D 9/00* (2006.01)
*F02C 9/18* (2006.01)
(Continued)

(52) U.S. Cl.
CPC ............ *F01D 9/023* (2013.01); *F01D 25/24* (2013.01); *F02C 3/04* (2013.01); *F02C 3/145* (2013.01);
(Continued)

(58) Field of Classification Search
CPC .. F23R 2900/03342; F23R 3/002; F23R 3/44; F23R 3/60; F02C 1/06; F02C 7/08;
(Continued)

(56) References Cited

U.S. PATENT DOCUMENTS 2,713,245 A 7/1955 Weaving
3,010,281 A 11/1961 Cervenka et al.
(Continued)

FOREIGN PATENT DOCUMENTS

DE 2458274 A1 6/1976
GB 2232720 A 12/1990

OTHER PUBLICATIONS

EP Search Report dated Aug. 4, 2014, for EP application No. 14162725.7.
(Continued)

*Primary Examiner* — Andrew Nguyen
(74) *Attorney, Agent, or Firm* — Beusse Wolter Sanks & Maire

(57) ABSTRACT

A gas turbine has a compressor, a central housing, at least one combustion chamber, an expansion turbine, and a heat exchanger. Each combustion chamber is fluidically connected to the expansion turbine via an inner housing which is guided through the interior of the central housing. The compressor is fluidically separated from the interior of the central housing by an annular collection chamber connected to an outlet of the compressor and which has a number of discharge lines which are connected to the cold side of the heat exchanger during operation. Each combustion chamber is designed as a silo combustion chamber, and each silo combustion chamber has an inner wall, which delimits a combustion chamber, and an outer wall, and the outer wall surrounds the inner wall, thereby forming a cavity. The inner
(Continued)

wall transitions into the inner housing, and the cavity transitions into the interior of the central housing.

17 Claims, 3 Drawing Sheets

(51) Int. Cl.
    *F02C 7/10*     (2006.01)
    *F23R 3/60*     (2006.01)
    *F01D 9/02*     (2006.01)
    *F02C 3/04*     (2006.01)
    *F02C 7/18*     (2006.01)
    *F01D 25/24*     (2006.01)
    *F04D 29/54*     (2006.01)
    *F02C 9/20*     (2006.01)
    *F23R 3/00*     (2006.01)
    *F02C 3/14*     (2006.01)

(52) U.S. Cl.
    CPC ............... *F02C 7/10* (2013.01); *F02C 7/18* (2013.01); *F02C 9/18* (2013.01); *F02C 9/20* (2013.01); *F04D 29/541* (2013.01); *F23R 3/002* (2013.01); *F23R 3/60* (2013.01); *F05D 2220/32* (2013.01); *F05D 2240/35* (2013.01); *F23R 2900/03342* (2013.01)

(58) Field of Classification Search
    CPC .... F02C 7/10; F02C 3/14; F02C 3/145; F02C 9/18; F01D 9/023
    See application file for complete search history.

(56) References Cited

U.S. PATENT DOCUMENTS

| | | | |
|---|---|---|---|
| 3,228,190 A * | 1/1966 | Brown | F02C 7/08 60/39.511 |
| 3,367,403 A | 2/1968 | Sawyer et al. | |
| 3,939,904 A | 2/1976 | Beaufrere | |
| 5,085,038 A * | 2/1992 | Todman | F02C 3/14 60/39.37 |
| 2006/0130484 A1* | 6/2006 | Marcum | F01D 9/023 60/752 |

OTHER PUBLICATIONS

International Search Report dated Jul. 10, 2015, for PCT application No. PCT/EP2015/055790.
EP Search Report dated Aug. 4, 2014, for EP application No. 14162725.7
International Search Report dated Jul. 10, 2015, for PCT application No. PCT/EP2015/055790
English Translation of Written Opinion from the International Search Authority dated Jul. 10, 2015, for PCT application No. PCT/EP2015/055790.
Written Opinion of International Search Report from WIPO in German language dated Oct. 8, 2015, for PCT/2015/055790.
CN Office Action dated Apr. 1, 2017, for CN patent application No. 201580017810.0.

* cited by examiner

GAS TURBINE

CROSS REFERENCE TO RELATED APPLICATIONS

This application is the US National Stage of International Application No. PCT/EP2015/055790 filed Mar. 19, 2015, and claims the benefit thereof. The International Application claims the benefit of European Application No. EP14162725 filed Mar. 31, 2014. All of the applications are incorporated by reference herein in their entirety.

FIELD OF INVENTION

The invention relates to a gas turbine comprising a compressor, an intermediate casing, at least one combustion chamber, and an expansion turbine, wherein the or each combustion chamber is fluidically connected to the expansion turbine via an inner casing that is guided through the internal space of the intermediate casing.

BACKGROUND OF INVENTION

In a gas turbine, the combustion heat of a fuel is converted into mechanical work. The thermodynamic cycle that describes this conversion corresponds approximately to the Joule cycle.

In that context, first an oxygen-containing working gas, in practice generally air, is compressed by a compressor chamber, in the course of which it heats up from a starting temperature $T_1$ to $T_2$, and the pressure increases. In the second step, heat is supplied to the working gas in a combustion chamber at constant pressure by burning the admixed fuel, as a result of which the temperature rises further to $T_3$. The compressed, heated working gas then performs mechanical work by expanding and in the process driving the turbine via blades. In so doing, the temperature drops to $T_4$. The pressure also drops. Some of the mechanical work obtained at the turbine can be used for compression in the first stage. In a last stage, waste heat is extracted from the working gas at constant pressure by cooling, whereby the temperature drops back to $T_1$. For the approximation of an ideal gas, the efficiency of the process is given by $\eta=1-(T_4-T_1)/(T_3-T_2)$.

As a consequence of the widespread adoption of renewable energy generation in more and more industrialized countries, increased importance is placed on thermal power plants that use gas turbines. The lack of planning reliability that is naturally associated with energy generation using solar power or wind power must be equalized by sufficient reserve capacities in generation, which are also able to provide the required power as quickly as possible. In this case, power plants that are operated using gas turbines have a marked advantage, due to the volatility of the fuel used, over the thermodynamically more sluggish coal-fired power plants or even nuclear reactors.

The efficiency of a gas turbine as a quotient of the energy generated over the total energy content of the fuel used is well below 50%, even in a modern installation, since the heat supplied by combustion is discarded as waste heat, and thus the energy content of the waste heat after expansion of the working gas is no longer used.

However, the efficiency can be increased by using this waste heat, for example by using the waste heat in a second circuit to operate a steam turbine of a second thermal power plant (what is referred to as "combined cycle" technology). This allows the efficiency to be improved by the degree of waste heat that can be supplied to the steam turbine. However, this improvement in efficiency implies an increase in the system complexity, since it is now necessary to connect the entire steam circuit to the gas turbine and to coordinate it with the latter in terms of control, all of which increases the investment costs for a plant. In addition, many existing thermal power plants with gas turbines cannot readily be retrofitted with a steam circuit due to the dimensions of the components of the latter.

In this context, one possible further solution can be to use the waste heat of the exhaust gas of the gas turbine, by integration into a recuperator process, to further heat the working gas pre-compressed in the first step before the combustion heat of the fuel is supplied. Since in many gas turbines the temperature $T_2$ of the pre-compressed working gas is below the waste heat temperature $T_4$, in the ideal model the quantity of heat corresponding to this difference $T_4-T_2$ need not be supplied to the working gas by the energy content of the fuel but can be saved, which leads to a corresponding increase in efficiency.

In this context, one problem arises from the technical implementation of the integration in particular of an existing gas turbine system into a recuperator process, wherein the removal of the pre-compressed working gas and forwarding of same to the heat exchanger is of particular significance in this context on account of the spatial limitations within the gas turbine, in particular in the region of the compressor.

This problem was addressed by the teachings of U.S. Pat. No. 3,367,403 A and GB 2232720 A, which can describe the return of heat from the exhaust gas of a gas turbine to the pre-compressed working gas.

However, in the case of these solutions known from the prior art, the material of the inner wall that bounds the combustion chamber is subjected to high thermal loads due to the high temperatures, of up to 1400° C., that arise in the combustion chamber of the gas turbine. In particular, the high temperatures increase the thermal stresses in the material since the temperature difference between the media in contact with the two sides of this inner wall varies by several hundred degrees. Thus, accelerated material fatigue of this inner wall is to be expected since these thermal stresses increasingly lead to microscopic cracks due to the large temperature differences.

SUMMARY OF INVENTION

The invention has an object, in a gas turbine, of avoiding these drawbacks of the prior art. In particular, it is to be avoided that the material of the inner wall that bounds the combustion chamber is thermally loaded by stresses to the point that an undesired reduction in the lifespan of this inner wall results.

According to the invention, the object is achieved with a gas turbine comprising a compressor, an intermediate casing, at least one combustion chamber, an expansion turbine, and a heat exchanger, wherein the or each combustion chamber is fluidically connected to the expansion turbine via an inner casing that is guided through the internal space of the intermediate casing, wherein the compressor is fluidically separated from the internal space of the intermediate casing by an annular plenum chamber which is connected to an outlet of the compressor and which has a number of discharge lines that, in operation, are connected to the cold side of the heat exchanger.

It is also provided, according to the invention, that the or each combustion chamber is designed as a silo combustion chamber. In that regard, the plenum chamber can be arranged between the inner casing, that leads from the or each combustion chamber to the expansion turbine, and the compressor, which is particularly advantageous in terms of construction since only the plenum chamber itself need be configured with respect to an existing concept.

In addition, according to the invention, the or each silo combustion chamber has an inner wall bounding a combustion space and an outer wall, wherein the outer wall surrounds the inner wall forming a cavity, wherein the inner wall transitions into the inner casing and wherein the cavity transitions into the internal space of the intermediate casing. By virtue of the twin-walled configuration of the combustion chamber, the cavity can be traversed by a gas for better cooling of the inner wall, as a consequence of which said loadability requirements and accordingly costs can be reduced.

Thus, the invention differs from other approaches from the prior art, such as that taught by U.S. Pat. No. 3,228,190 A. Although this document does also provide for the formation of a cavity between an inner wall and an outer wall of a silo combustion chamber, it cannot teach in particular that the cavity transitions into the internal space of the intermediate casing, with the compressor being fluidically separated from the internal space of the intermediate casing by an annular plenum chamber. Moreover, U.S. Pat. No. 3,228,190 A describes an embodiment that necessarily requires that the internal space of the intermediate casing is fluidically directly connected to the plenum chamber via a transition. Thermal decoupling is thus impossible, and moreover not desirable either since in said U.S. Pat. No. 3,228,190 A the cooling effect is the priority. However, this is at the expense of material fatigue of the inner wall, which is to be avoided with the technical features of the present invention.

In this context, the cold side of the heat exchanger is to be understood as all of the inflow lines to the region in which, in the heat exchanger, the transfer of heat between the working gas flowing through the latter and the heat supply takes place. In particular, in this context the heat exchanger can be supplied with heat by the waste heat of the gas turbine, and in particular the working gas heated in the heat exchanger can in that case be conveyed to the or each burner of the combustion chamber in order to supply oxygen. In this context, the compressor is to be understood as all of the individual and separate units which, within the gas turbine, serve the technical purpose of compressing the working gas and are arranged upstream of the or each burner.

In addition to the above-mentioned advantages, the invention is also based on the following consideration:

The design of a gas turbine requires complex modelling in terms of fluid dynamics, materials and thermodynamics and numerical calculations, which to a large degree have to be verified by practical testing on prototypes. Thus, any modification to an existing gas turbine system also requires that said models and calculations be adapted. It is thus of considerable advantage to configure a mechanism for removing the pre-compressed working gas and for forwarding same to a heat exchanger a priori such that it can be integrated into an existing gas turbine design with minimal structural modifications. Moreover, this also opens the possibility of retrofitting an already-commissioned gas turbine, in which no heat exchanger is provided, with relatively little expenditure.

Under the condition of minimal modifications, it appears at first obvious to arrange the or each outflow line for removing the working gas directly at the outlet of the compressor. However, an important observation of the invention is that this approach could be disadvantageous in terms of flow since it could result in a pressure gradient at the outlet of the compressor, over the cross-sectional area thereof, in the direction of the respective outflow line. This could lead to turbulent flow and to a very inhomogeneous pressure distribution in the compressor, which would substantially reduce the efficiency of the compression process, that is to say the compression power per unit of energy used.

By contrast, and in spite of the limited space between the compressor and the inner casing, the invention proposes providing a plenum chamber in the intermediate casing, at the outlet of the compressor, from which plenum chamber the or each outflow line is routed to the heat exchanger. An advantageous pressure distribution in this plenum chamber is now possible, without this requiring substantial structural changes to the gas turbine. The new resulting expenditure with respect to the design is limited to guiding the flow of the working gas at the outlet of the compressor, in the plenum chamber itself and in the respective outflow line.

Advantageously, the plenum chamber is separated from the internal space of the intermediate casing by a wall running from the outlet of the compressor up to the intermediate casing. In particular, in this case the or each discharge line is guided through that part of the casing of the gas turbine that surrounds the compressor, and connects to the intermediate casing at the join of the wall. This is advantageous in particular if, in an existing design on the basis of which the gas turbine is to be constructed or retrofitted, the installation space in the intermediate casing is limited, for example by the compressor outlet being close to the inner casing. In certain cases, the compressor outlet can in this context be adapted to the available installation space, such that the flow guiding, as seen in the axial direction, is routed away from the intermediate casing by a manifold. In particular, the manifold can in that context be made rotationally symmetric, such that the wall that separates the plenum chamber from the internal space of the intermediate casing is formed by a number of partition plates that run from an edge of the manifold to the intermediate casing. In particular, the intermediate casing can in this context have a circumferential groove at the join of the wall in order to improve the fluidic separation effect of the wall.

Expediently, the outlet of the compressor is designed as an annular outlet diffuser. This is a design variant that is chosen particularly frequently in gas turbines since, by way of the diffuser, by reducing the flow speed of the working gas there, it is possible to achieve a further pressure increase for the latter. In addition, an annular diffuser provides for a pressure distribution that is as homogeneous as possible and for an even mass flow of the working gas from the compressor into the plenum chamber. In particular, the outlet diffuser can in this context have, in the axial direction, a manifold away from the intermediate casing, which reduces the installation space required for the plenum chamber, since the latter can thus be arranged in the immediate vicinity of the compressor.

For a particularly homogeneous pressure distribution in the plenum chamber and a particularly even mass flow of the working gas from the plenum chamber into the or each discharge line, it is in particular possible for a plurality of discharge lines to lead rotationally symmetrically away from the plenum chamber, or for a plurality of groups of discharge lines to each lead rotationally symmetrically away from the plenum chamber.

It has further proven to be advantageous if a direct fluidic connection between the or each discharge line and the internal space of the intermediate casing can be established via a bypass. This makes it possible for part of the pre-compressed working gas to be guided via the bypass into the internal space of the intermediate casing, where the working gas can flow around the inner casing. Since, in operation, the mixture of fuel and working gas burnt in the combustion chamber is conveyed to the expansion turbine via the inner casing, the inner casing can be exposed to high temperatures which can lead to particular loadability requirements for the material of the inner casing. By making part of the pre-compressed working gas flow around the inner casing, it is possible to achieve a cooling effect which reduces said requirements.

In addition, a bypass from the discharge line to the internal space of the intermediate casing makes it possible to keep the internal space of the intermediate casing at a similar pressure to the combustion space of the combustion chamber and the internal space of the inner casing that transitions thereinto. A slight pressure difference between said spaces simplifies the structural configuration of the inner casing.

Expediently, in this context the bypass has a number of valves and a number of pipelines, each connected to a valve, wherein the connection between the or each discharge line and the internal space of the intermediate casing passes in each case via a valve and a pipeline. The presence of one or more valves makes it particularly simple to control the mass flow of the pre-compressed working gas from the compressor into the internal space of the intermediate casing and thus the cooling effect in particular at the inner casing.

Expediently, the or each valve is in that case arranged on the respective discharge line, inside the intermediate casing. Thus, the corresponding pipeline need not be led out of the gas turbine through the intermediate casing, which minimizes the necessary structural changes with respect to an existing design.

Alternatively, the or each valve can be arranged on the respective discharge line, outside the gas turbine. This can be advantageous if particularly simple accessibility of the or each valve during operation is desired, for example if the gas turbine is not intended for operation in long-term use, but rather is intended to be frequently started up and shut down after a certain operating time, as a consequence of which a particular fluidic control requirement can possibly result.

Expediently, the inner wall of the or each silo combustion chamber has a multiplicity of bores. Bores of this type allow pre-compressed working gas to flow, as a consequence of the pressure difference and in small quantities, from the cavity into the combustion chamber, where it contributes to cooling the material of the inner wall. This further reduces the temperature for which the materials used for the inner wall need to be designed.

Advantageously, the inner casing has a multiplicity of bores. Bores of this type allow pre-compressed working gas to flow, as a consequence of the pressure difference and in small quantities, from the internal space of the intermediate casing into the internal space of the inner casing that is connected to the combustion chamber, where it contributes to cooling the material of the inner casing. This further reduces the temperature for which the materials used for the inner casing need to be designed.

The invention further specifies a thermal power plant having an above-described gas turbine. The advantages of the gas turbine and of its refinements can in this context be transferred, in corresponding fashion, to the thermal power plant.

BRIEF DESCRIPTION OF THE DRAWINGS

There follows a more detailed explanation of an exemplary embodiment of the invention, with reference to a drawing, in which, schematically.

Mutually corresponding parts and variables are in each case provided with identical reference signs in all figures.

DETAILED DESCRIPTION OF INVENTION

Figure 1:
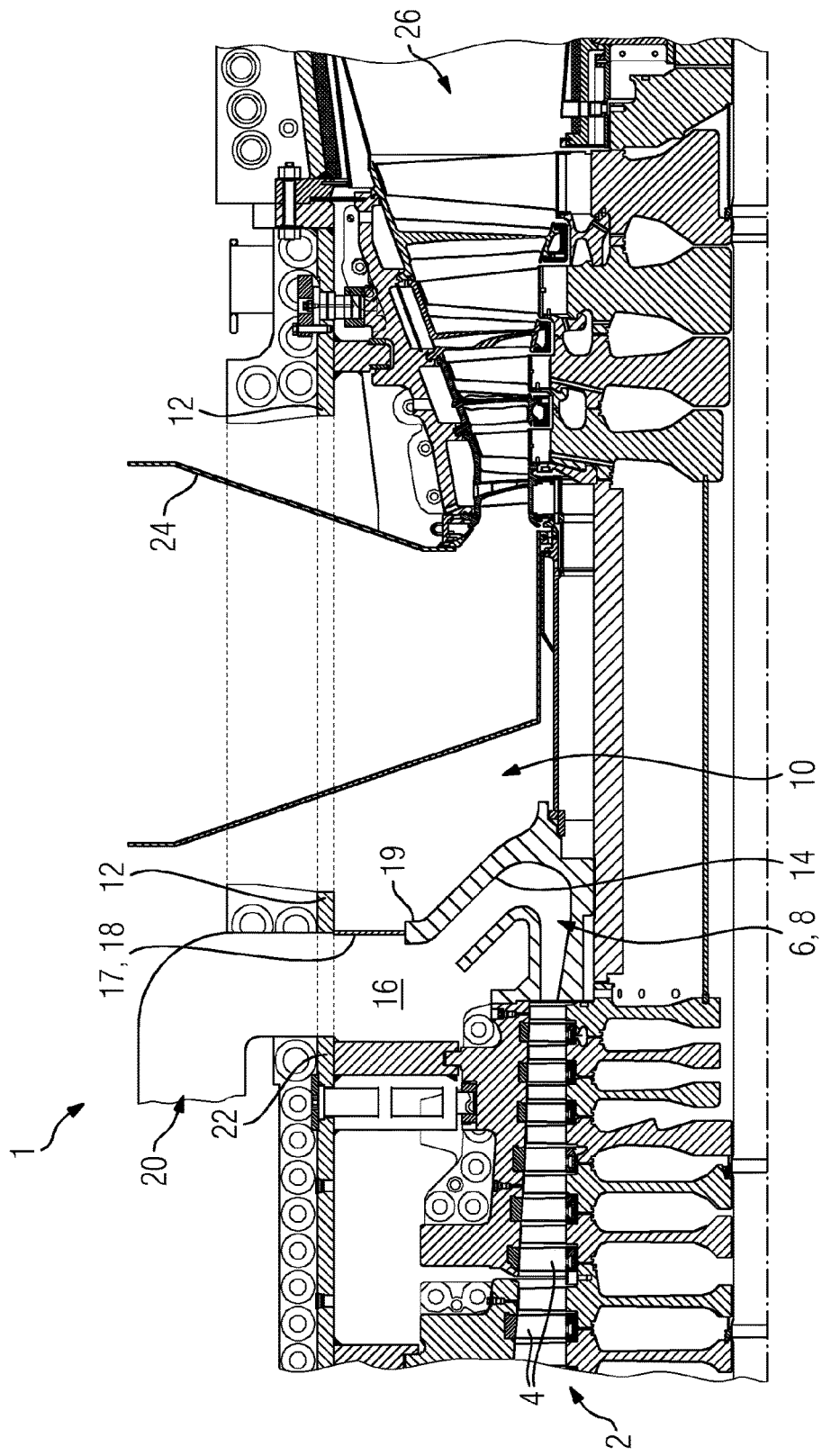
FIG. 1 shows, in an axial sectional representation, a detail of a gas turbine having a plenum chamber at the outlet of the compressor.

FIG. 1 shows, in an axial sectional representation, a detail of a gas turbine 1. The gas turbine 1 comprises a compressor 2 with compressor chambers 4 that lead to an outlet 8 designed as an outlet diffuser 6. In this context, the outlet diffuser 6 has, proceeding away from the internal space 10 of the intermediate casing 12, a manifold 14 of U-shaped cross section. A plenum chamber 16 is connected to the compressor 2 via the outlet diffuser 6 and is separated fluidically from the internal space 10 of the intermediate casing 12 by a wall 17. In that context, the circumferential wall 17 consists of a circumferential partition plate 18 which extends radially from the outer edge 19 of the manifold 14 to the intermediate casing 12. From the plenum chamber 16, a discharge line 20 is guided through the front casing 22 which is connected to the intermediate casing 12 and surrounds the compressor 2, and is connected (in a manner which is not shown in greater detail) to a heat exchanger.

An inner casing 24, which connects the combustion space of a silo combustion chamber (not shown) to the expansion turbine 26, is guided through the intermediate casing 12. During operation of the gas turbine 1, air as working gas is compressed in the compressor 2. This air flows via the outlet diffuser 6 into the plenum chamber 16 and is guided, via the discharge line 20 and a line system (not shown in the drawing), to a heat exchanger, part of the air being returned to the internal space 10 of the intermediate casing 12. Here, the pre-compressed air can contribute to cooling the inner casing 24, through which a burnt fuel-air mixture flows from the combustion space to the expansion turbine 26, as a result of which raised temperatures arise at the inner casing. By virtue of the cooling effect of the air that is partially returned to the internal space of the inner casing, the material of the inner casing can be designed for lower maximum temperatures.

Figure 2:
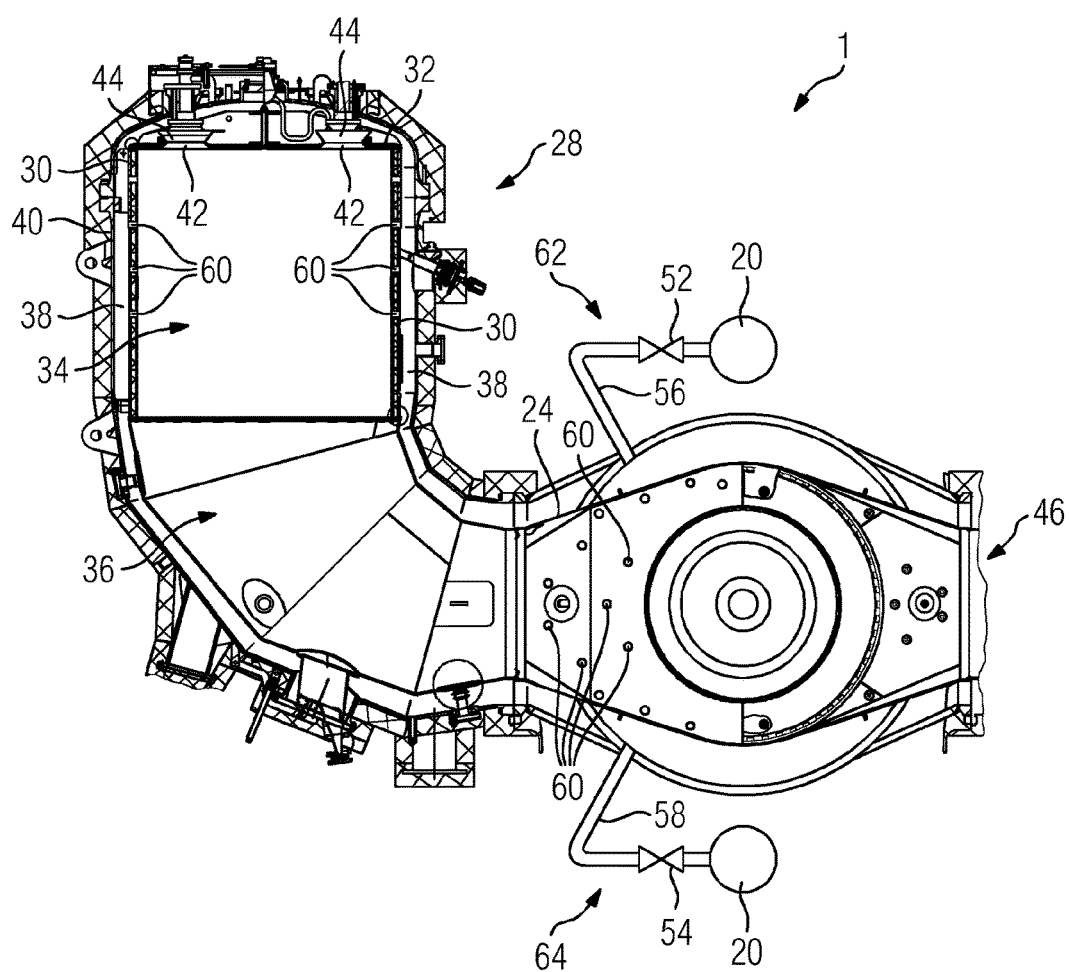
FIG. 2 shows, in a cross-sectional representation, a gas turbine with a silo combustion chamber.

FIG. 2 shows, in a cross-sectional representation, a gas turbine 1 with a silo combustion chamber 28. In that context, the view is from behind the plenum chamber in the direction of the expansion turbine. The silo combustion chamber 28 comprises an inner wall 30 which, together with the flame tube base 32, bounds the combustion space 34 of the flame tube 36. The inner wall 30 and the flame tube base 32 are surrounded by an outer wall 40, forming a cavity 38. Burners 44 open into the combustion space 34 via openings 42 in the flame tube base 32.

The inner wall 30 transitions, at its radially inner end, into the inner casing 24, such that the combustion space 34 is fluidically connected to the internal space of the inner casing 24. The outer wall 40 transitions into the intermediate casing 12, such that the cavity 38 is directly connected to the internal space 10 of the intermediate casing 12. At the opposite end 46, the inner casing 24 transitions into the inner wall of another silo combustion chamber (not shown in greater detail here) which is essentially of the same construction as and symmetric with the silo combustion chamber 28.

The plenum chamber (not shown here) is arranged in front of the inner casing 24 and is connected, via the manifold, to the outlet diffuser of the compressor. Two discharge lines 20, shown here in cross section, lead away from the plenum chamber through the intermediate casing 12. The discharge lines 20 lead to the cold side of a heat exchanger (not shown in greater detail). A pipeline 56, 58 leads, in each case via a valve 52, 54, from the discharge lines 20 through the intermediate casing 12 back into the internal space 10 of the intermediate casing 12. Just like the inner wall 30, the inner casing 24 also has a multiplicity of bores 60.

During operation of the gas turbine 1, the air pre-compressed by the compressor is removed via the plenum chamber and is guided via the discharge lines 20 in the direction of the cold side of the heat exchanger. In this context, the valves 52, 54 and the pipelines 56, 58 respectively form a bypass 62, 64 via which, with control of the mass flow, part of the air can flow back into the internal space 10 of the intermediate casing 12 and thus also into the cavity 38 between the inner wall 30 and the outer wall 40. Thus, the pre-compressed air can contribute to cooling of the inner casing 42 and of the inner wall 30, over which the fuel-air mixture burnt in the combustion chamber 34 flows. In this context, a consequence of the bores 60 is that the compressed air that is returned via the bypasses 62, 64 can flow into the interior of the flame tube 36 or of the inner casing 24, which further improves the cooling effect. By virtue of the mass flow of the air used for cooling, which can be controlled using the valves 52, 54, it is possible in this context to set an operating point of greatest thermodynamic efficiency.

From the hot side of the heat exchanger, the air must be returned, in a manner which is not part of the subject matter of the present invention, for the purpose of supplying oxygen to the burners 44.

Figure 3:
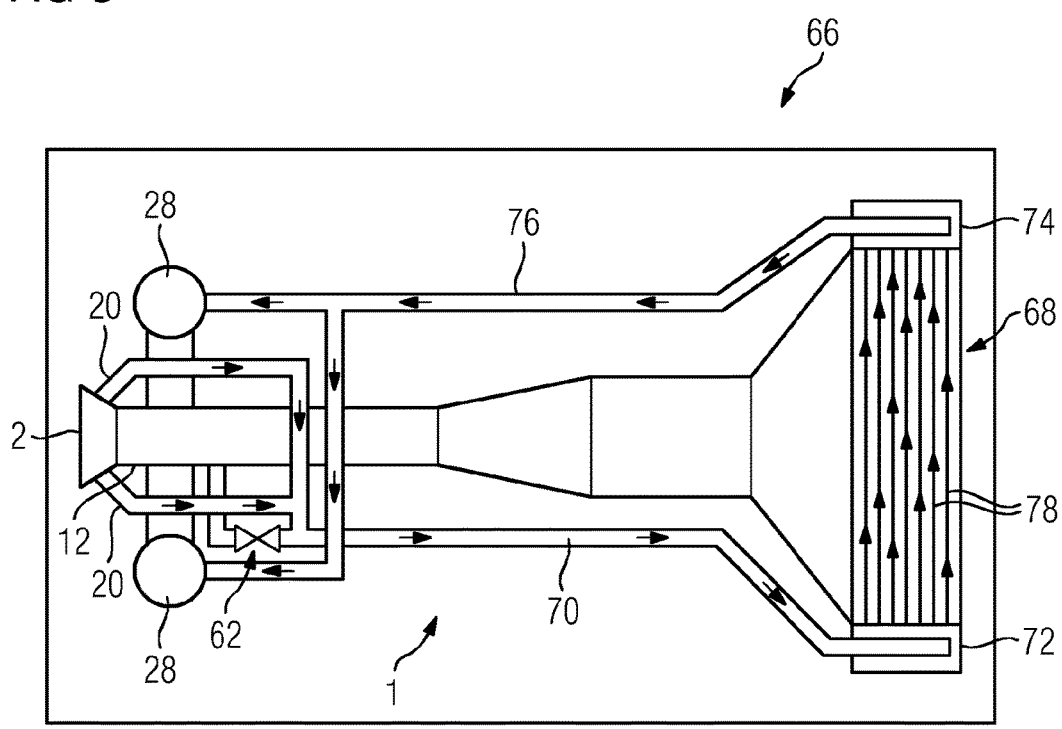
FIG. 3 shows a thermal power plant with a gas turbine having a heat exchanger.

FIG. 3 shows, schematically, a thermal power plant 66 with a gas turbine 1 having a heat exchanger 68. Discharge lines 20 lead, from the plenum chamber (not shown in the drawing) close to the compressor 2, out of the intermediate casing 12 to a line system 70 having a bypass 62 that leads back through the intermediate casing 12. The line system 70 is connected to the cold side 72 of the heat exchanger 68. A line 76 leads from the hot side 74 of the heat exchanger 68 in the direction of the two silo combustion chambers 28.

The air taken from the plenum chamber is guided through the discharge lines 20 to the line system 70. Part of the air is then guided, via the bypass 62, back into the internal space of the intermediate casing 12 for cooling purposes. The rest of the air is guided through the line system 70 to the heat exchanger 68, where it is heated in thin tubes 78 surrounded by the flow of waste heat from the silo combustion chambers 28. The air which is heated in this manner is now guided via the line 76 to the silo combustion chambers 28, where it is added to the oxygen supply of the respective burner in a manner which does not form part of the subject matter of the invention.

Although the invention has been described and illustrated in greater detail by means of the preferred exemplary embodiment, the invention is not limited by this exemplary embodiment. Other variants can be derived herefrom by a person skilled in the art without departing from the protective scope of the invention.

The invention claimed is:

1. A gas turbine comprising:
a compressor,
an intermediate casing,
at least one combustion chamber,
an expansion turbine, and
a heat exchanger,
wherein the or each combustion chamber is fluidically connected to the expansion turbine via an inner casing that is guided through an internal space of the intermediate casing,
wherein the compressor is fluidically separated from the internal space of the intermediate casing by an annular plenum chamber which is connected to an outlet of the compressor and which has at least one discharge line that, in operation, is connected to a cold side of the heat exchanger,
wherein the or each combustion chamber is designed as a silo combustion chamber and the or each silo combustion chamber has an inner wall bounding a combustion space and an outer wall, wherein the outer wall surrounds the inner wall forming a cavity, wherein the inner wall transitions into the inner casing and wherein the cavity transitions into the internal space of the intermediate casing, and
wherein the annular plenum chamber is separated from the internal space of the intermediate casing by a circumferential wall running from the outlet of the compressor up to the intermediate casing.

2. The gas turbine as claimed in claim 1,
wherein the outlet of the compressor is designed as an annular outlet diffuser.

3. The gas turbine as claimed in claim 1,
wherein a direct fluidic connection between the or each discharge line and the internal space of the intermediate casing can be established via a bypass.

4. The gas turbine as claimed in claim 3,
wherein the bypass comprises at least one valve and at least one pipeline, each pipeline connected to a respective valve of the at least one valve.

5. The gas turbine as claimed in claim 4,
wherein the or each valve is arranged on the respective discharge line, inside the intermediate casing.

6. The gas turbine as claimed in claim 4,
wherein the or each valve is arranged on the respective discharge line, outside the intermediate casing.

7. The gas turbine as claimed in claim 1,
wherein the inner wall of the or each silo combustion chamber has a multiplicity of bores.

8. The gas turbine as claimed in claim 1,
wherein the inner casing has a multiplicity of bores.

9. A thermal power plant comprising:
a gas turbine as claimed in claim 1.

10. A gas turbine comprising:
a compressor,
an intermediate casing,
at least one combustion chamber,
an expansion turbine, and
a heat exchanger,
wherein the or each combustion chamber is fluidically connected to the expansion turbine via an inner casing that is guided through an internal space of the intermediate casing,
wherein the compressor is fluidically separated from the internal space of the intermediate casing by an annular plenum chamber which is connected to an outlet of the compressor and which has at least one discharge line that, in operation, is connected to a cold side of the heat exchanger,
wherein the or each combustion chamber is designed as a silo combustion chamber and the or each silo combustion chamber has an inner wall bounding a combustion space and an outer wall, wherein the outer wall surrounds the inner wall forming a cavity, wherein the inner wall transitions into the inner casing and wherein the cavity transitions into the internal space of the intermediate casing, wherein a direct fluidic connection between the or each discharge line and the internal space of the intermediate casing can be established via a bypass, and wherein the bypass comprises at least one valve and at least one pipeline, each pipeline connected to a respective valve of the at least one valve.

11. The gas turbine as claimed in claim 10,
wherein the plenum chamber is separated from the internal space of the intermediate casing by a wall running from the outlet of the compressor up to the intermediate casing.

12. The gas turbine as claimed in claim 10,
wherein the outlet of the compressor is designed as an annular outlet diffuser.

13. The gas turbine as claimed in claim 10,
wherein the or each valve is arranged on the respective discharge line, inside the intermediate casing.

14. The gas turbine as claimed in claim 10,
wherein the or each valve is arranged on the respective discharge line, outside the intermediate casing.

15. The gas turbine as claimed in claim 10,
wherein the inner wall of the or each silo combustion chamber has a multiplicity of bores.

16. The gas turbine as claimed in claim 10,
wherein the inner casing has a multiplicity of bores.

17. A thermal power plant comprising:
a gas turbine as claimed in claim 10.

* * * * *